United States Patent [19]

Fischer et al.

[11] Patent Number: 4,890,690
[45] Date of Patent: Jan. 2, 1990

[54] EXHAUST GAS MUFFLER FOR A TWO-STROKE ENGINE

[75] Inventors: Hartmut Fischer, Winnenden; Jürgen Grassmuck, Stuttgart; Michael Wissmann, Schorndorf-Weiler; Albert Dreher, Waiblingen, all of Fed. Rep. of Germany

[73] Assignee: Andreas Stihl, Waiblingen, Fed. Rep. of Germany

[21] Appl. No.: 240,818

[22] Filed: Sep. 6, 1988

[30] Foreign Application Priority Data

Sep. 3, 1987 [DE] Fed. Rep. of Germany ....... 3729477

[51] Int. Cl.⁴ ............................ F01N 1/14; F01N 3/15
[52] U.S. Cl. .................................... 181/240; 181/228; 181/231; 181/258; 181/262; 181/265; 181/272; 181/282; 60/299; 60/314
[58] Field of Search ............... 181/228, 230, 231, 240, 181/262, 265, 292, 282; 60/299, 301, 302, 314

[56] References Cited

U.S. PATENT DOCUMENTS

| | | | |
|---|---|---|---|
| 3,644,098 | 2/1972 | De Palma et al. | 60/302 X |
| 3,798,769 | 3/1974 | Bailey | 181/240 X |
| 4,050,903 | 9/1977 | Bailey et al. | 60/301 X |
| 4,086,063 | 4/1978 | Garcea | 60/299 X |
| 4,142,607 | 3/1979 | Landwehr et al. | 181/240 X |
| 4,370,855 | 2/1983 | Tuggle | 181/240 X |
| 4,693,337 | 9/1987 | Timmermeister | 181/258 X |

Primary Examiner—B. R. Fuller
Attorney, Agent, or Firm—Walter Ottesen

[57] ABSTRACT

The invention is directed to an exhaust gas muffler for a two-cycle engine, especially for a handheld portable tool, such as a chain saw. In exhaust gas mufflers equipped with a catalyzer, the formation of flame from the fuel-containing exhaust gases exiting from the muffler must be prevented. These exhaust gases are intensely overheated because of the exothermal process in the catalyzer. The muffler according to the invention includes a catalyzer which establishes a connection between separate component chambers of the muffler housing. The muffler can be mounted directly on the motor outlet.

17 Claims, 4 Drawing Sheets

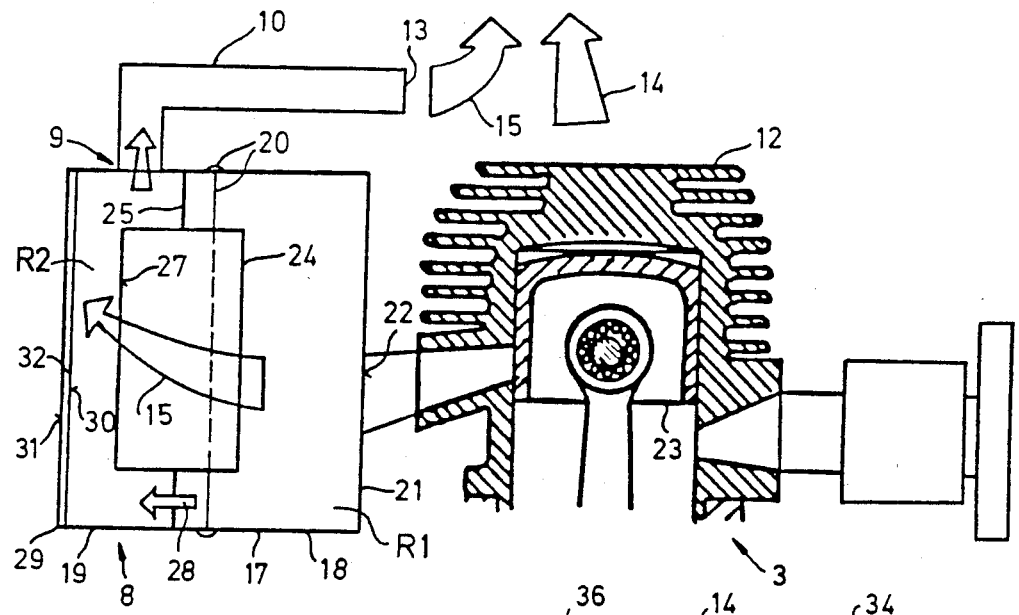
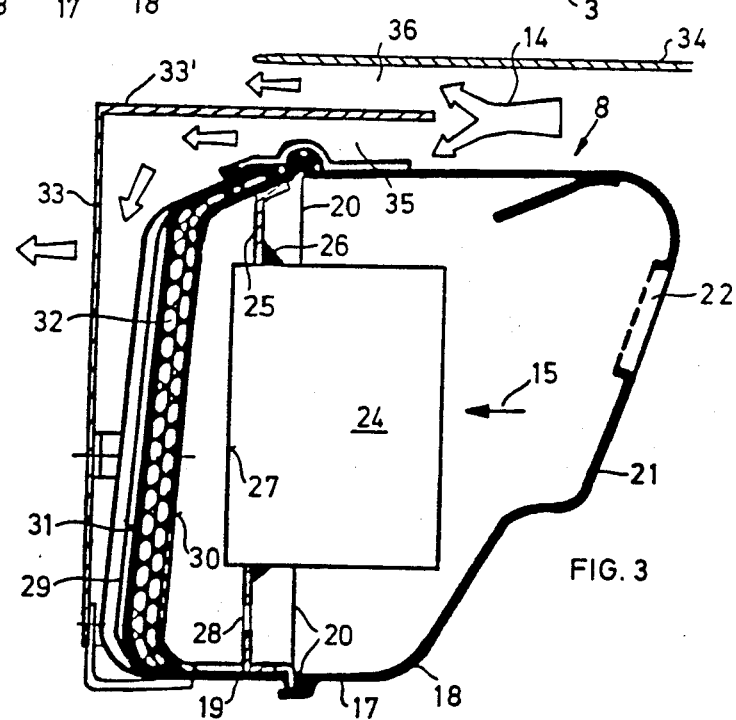
FIG. 2
FIG. 3

EXHAUST GAS MUFFLER FOR A TWO-STROKE ENGINE

FIELD OF THE INVENTION

The invention relates to an exhaust gas muffler for a two-stroke engine especially for a handheld portable tool such as a chain saw or the like. The exhaust gas muffler includes a catalyzer mounted in the housing of the muffler.

BACKGROUND OF THE INVENTION

The exhaust gases of a two-stroke engine of a motor-driven chain saw enter the catalyzer with an exhaust gas temperature of approximately 600° C. A chemical conversion process takes place in the catalyzer where, for example, hydrocarbons are converted to carbon dioxide and water and this conversion process causes the temperature to increase in the catalyzer to approximately 1,000° C. since the conversion process is exothermal. Energy-rich exhaust gases are available for the conversion process because of the scavenging losses which are typical for a two-stroke engine. During the conversion process, heat energy is released which corresponds approximately to the energy delivered by the engine.

Since the catalyzer is uncontrolled, a deficiency of air can not be excluded in component regions of the characteristic field of the engine so that a complete conversion of the noxious exhaust gas components of hydrocarbons and carbon monoxide can not be obtained in these regions. If these exhaust gases reach the ambient air containing oxygen through the exhaust outlet or through a gap at the partition interface of the muffler housing, the residual gas can ignite if the temperature downstream of the catalyzer is correspondingly high for the oxidation processes. This can be disadvantageous especially for handheld portable tools such as chain saws and especially when there is a switchover from high rotational speed and full-load operation to idle operation.

SUMMARY OF THE INVENTION

It is an object of the invention to provide an exhaust gas muffler which is improved such that a rapidly initiated conversion is assured after the start of the engine. It is a further object of the invention to provide such an exhaust gas muffler so that an ignition of vented exhaust gases containing fuel is prevented.

The exhaust gas muffler of the invention is for a two-stroke engine, especially for a handheld portable tool such as a chain saw. The engine includes a cylinder and a piston which conjointly define a combustion chamber wherein combustion gases are generated during operation of the engine. The exhaust gas muffler of the invention comprises a housing having an inner housing wall surface defining an interior space; a catalyzer disposed in the interior space and including an enclosure wall having an outer enclosure wall surface; mounting means for mounting the catalyzer in the interior space so as to cause the outer enclosure wall surface to be in spaced relationship to the inner housing wall surface on all sides of the catalyzer; the mounting means and the catalyzer conjointly partitioning the interior space into first and second chambers; the housing having an inlet in the first chamber communicating with the combustion chamber of the engine so that the exhaust gases can pass into the first chamber; the catalyzer defining a catalytic chamber for interconnecting the first and second chambers and for exothermally converting the exhaust gas and passing the converted exhaust gas to the second chamber; and, the housing having an outlet in the second chamber for passing the exothermally converted exhaust gas out of the muffler.

BRIEF DESCRIPTION OF THE DRAWINGS

The invention will now be described with reference to the drawings wherein:

FIG. 2 is a schematic showing a portion of the internal combustion engine with the exhaust gas muffler corresponding thereto for the portable tool shown in FIG. 1;

FIG. 3 is a side elevation view, partially in section, of the exhaust gas muffler of FIGS. 1 and 2;

DESCRIPTION OF THE PREFERRED EMBODIMENTS OF THE INVENTION

Figure 1:
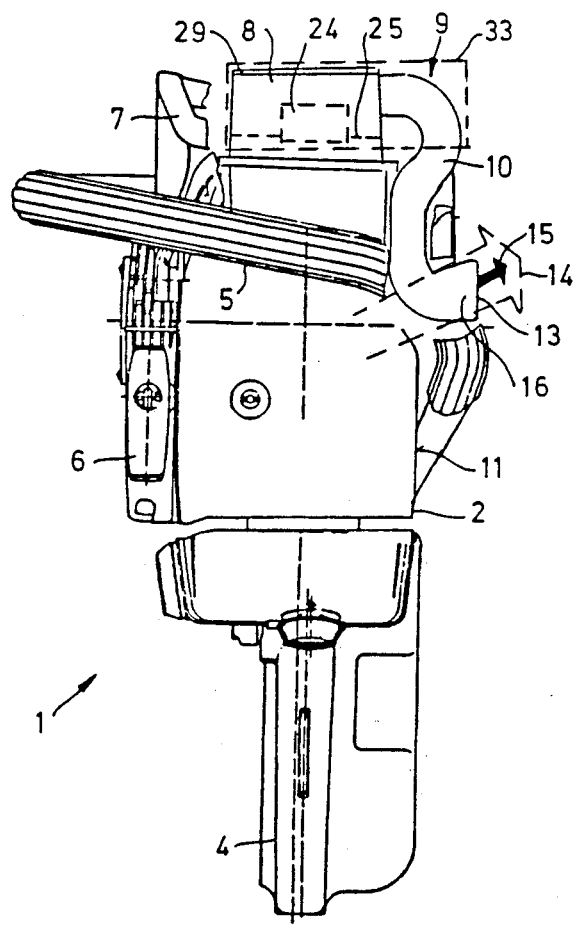
FIG. 1 is a plan view of a handheld portable tool equipped with an exhaust gas muffler according to the invention.
Figure 4:
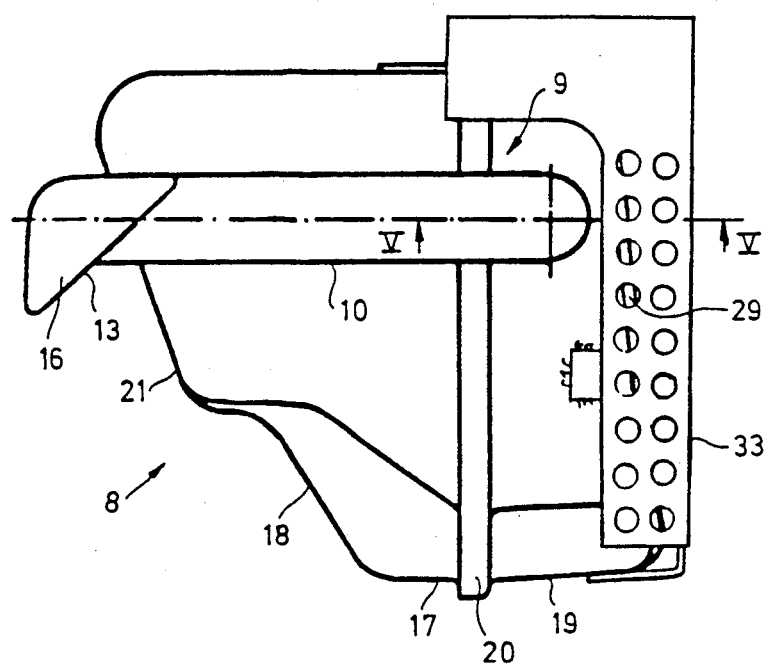
FIG. 4 is the exhaust gas muffler of FIG. 3 shown in another side elevation view.
Figure 5:
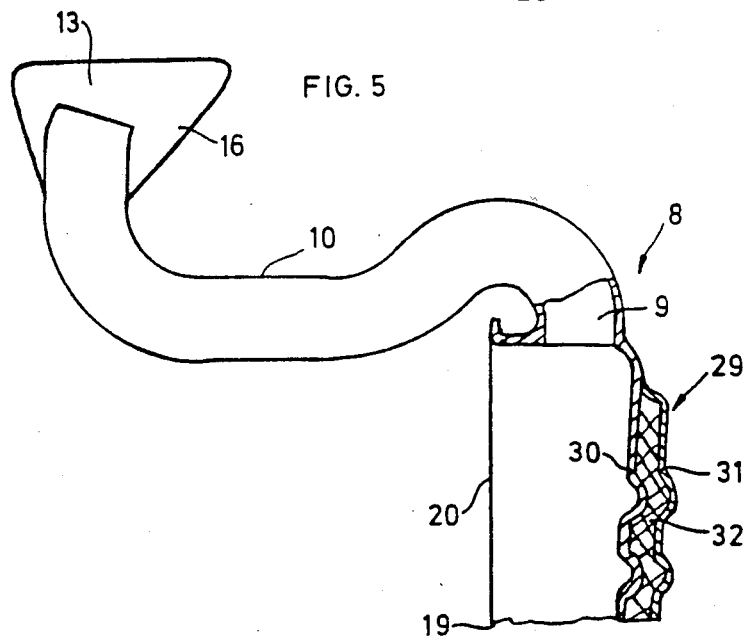
FIG. 5 is a portion of the exhaust gas muffler of FIG. 4 shown from below along the line V—V of FIG. 4 and partially in section.

The portable handheld tool shown in the drawing is in the form of a motor-driven chain saw 1 which includes a housing 2 containing a two-stroke engine 3 (FIG. 2), a rearward handle 4, a bale-type handle 5, a starter cord 6, a hand guard 7, an exhaust gas muffler 8 and a guide bar (not shown) on which a saw chain driven by the engine 3 is guided.

The exhaust gas output 9 of the muffler 8 includes a pipe 10 with bends formed therein and the pipe 10 is provided on the right-hand longitudinal side 11 of the housing 2 as shown in FIG. 1. This pipe 10 can also be characterized as a guide pipe which conducts the exhaust gas and extends in the rearward direction up to the vicinity of the cylinder 12 (FIG. 2) of the engine 3. The guide pipe 10 is so mounted and bent that the outlet opening 13 is located next to the cylinder 12 in the region beneath the tube defining handle 5 and faces outwardly transversely to the longitudinal direction of the portable tool 1. The outlet opening 13 is preferably so positioned that it lies in the cool-air flow 14 of the engine 3. The exhaust gas 15 exiting from the outlet opening 13 of the exhaust gas guide tube 10 is then entrained outwardly by the cool-air flow 14 flowing outwardly from the cylinder 12. This results simultaneously in a sharp reduction of the exhaust gas temperature.

In order to prevent the exhaust gas 15 flowing out of the outlet opening 13 from annoying the person operating the portable tool, it can be advantageous to provide a deflector wall 16 at the exhaust gas outlet which directs the exhaust gas 15 in a downward direction. The deflector wall can be configured so as to expand in a fan-like manner so that an intensive mixing of the out-flowing exhaust gas 15 with the cool-air flow 14 is also achieved.

The housing 17 of the exhaust gas muffler 8 essentially comprises a shell-shaped housing part 18 disposed near the cylinder 12 and a housing shell 19. The housing shell 19 and the housing part 18 are seated against each other at their respective end face edges so that a housing partition interface 20 is formed approximately at the center of the housing 17. In the rear wall 21 of the housing part 18 facing toward the cylinder 12, an input 22 is provided for the exhaust gas discharged from the cylinder 12 by the piston 23. The exhaust gas output 9 of the muffler 8 is located at the right-hand side wall of the housing shell 19. The housing part 18 and the housing shell 19 can be seated together at the partition interface 20 so that a substantially tight closure is obtained.

A catalyzer 24 is located in the housing 17 which converts most of the hydrocarbons contained in the exhaust gas to carbon dioxide and water. This chemical conversion process is an exothermal reaction process wherein the hot exhaust gases which enter the muffler 8 from the cylinder 12 at approximately 600° C. can be heated up to temperatures above 1,000° C.

The catalyzer 24 is disposed in a partition wall 25 which can be configured as an inner shell formed of sheet metal and which carries the catalyzer 24. The catalyzer 24 is preferably seated in a break-out of the partition wall 25 and connected about the outer periphery thereof with the partition wall 25 such that a gas-tight closure is obtained. The partition wall 25 itself can, in turn, be advantageously attached in the housing shell 19 and it can likewise be advantageous to weld the outer periphery of the partition wall 25 gastight to the wall of the housing shell 19 at the inner side of the latter. The partition wall 25 is positioned in the housing shell 19 so that it is in a plane behind the housing partition interface 20 when viewed in the flow direction of the exhaust gas as shown by arrow 15. Stated otherwise, the partition wall 25 is disposed downstream of the housing partition interface 20.

The partition wall 25 essentially fulfills three functions. First, it supports the catalyzer 24 and holds it in its position within the muffler 8 in spaced relationship on all sides with respect to the inner wall surface of the muffler. Second, the catalyzer 24 partitions the exhaust gas muffler 8 into the exhaust gas chambers R1 and R2 and compels the exhaust gas 15 within the muffler 8 to pass through the catalyzer 24 without component quantities flowing by laterally so that the entire exhaust gas quantity is subjected to the conversion process in the catalyzer 24. Third, with the special arrangement of the partition wall 25 in a plane behind the housing partition interface 20, it is assured that the exhaust gas 15 flowing from the output side 27 of the catalyzer 24 can not get back to the region of the housing partition interface 20 so that an ignition of the exhaust gas flowing out of the catalyzer 24 and heated to over 1,000° C. can not occur at the partition interface 20. In this connection, it is noted that the exhaust gas still contains energy-rich component parts because of incomplete conversion.

Furthermore, it can be advantageous to provide a bypass bore 28 in the partition wall 25. Because of the high temperatures behind the catalyzer 24, small bypass quantities are afterburned in the chamber downstream of the catalyzer 24. By means of the bypass 28, a throttling action of the catalyzer 24 and a reduction in capacity which may result therefrom can be eliminated.

The housing 19 of the muffler 18 can preferably have a double wall 29 at least on the side of the muffler housing lying opposite to the gas outlet side 27 of the catalyzer 24. This double wall 29 can comprise an inner wall 30 facing toward the catalyzer 24 and an outer wall arranged in spaced relationship to the inner wall 30. It can be advantageous to provide a high-temperature resistant insulating material 32 in the space between the inner wall 30 and the outer wall 31 which is preferably an aluminum silicate. The temperature of the outer surface of the muffler is considerably reduced by the insulating insert 32 and this reduction is from approximately 1,000° C. to approximately 500° C. since the aluminum silicate fiber mesh constitutes a poor conductor of heat and because this outer surface of the muffler is cooled by the ambient air flowing past the outer wall 31. Furthermore, the heat of the exhaust gas distributes itself on the relatively large surface of the inner wall 30 of the double-walled housing shell 19 so that the temperature of the exhaust gases can be dropped by 200° to 300° C. already at the inner wall 30 and then a further reduction is achieved by means of the insulating material 32 and by means of the outer wall 31 which is subjected directly to the ambient air.

The insulation leads to a high temperature of the catalytic chamber which only drops very slowly even after the engine 3 is turned off. This characteristic leads to a very quick start of the catalyzer 24 when the engine is restarted.

Furthermore, it can be advantageous to provide a touch protective member 33 on the housing 17 of the muffler 8 by means of which the user is protected against the parts which are nonetheless still relatively hot. The touch protective member 33 can be advantageously made from a perforated sheet metal which can be bent to have a hood-shaped or a U-shaped form and which can be fastened with threads to the double-walled housing shell. The touch protective member 33 is mounted so as to be in spaced relationship forward of the outer wall 31 of the housing shell 19 so that the ambient air can brush past for cooling the touch protective surface 33 on the outer side as well as on the inner side. In order to obtain only a minimal heat-conductive connection between the muffler 8 and the touch protective member 33, the protective member 33 is advantageously attached at only two or three locations with insulating spacers being provided at the attachment locations which restrict the passage of heat.

By means of the bent exhaust guide tube 10, the exhaust gas is conducted toward the rear to the forward handle tube 5. The output opening 13 lies directly beneath the handle tube 5 next to the cylinder 12 from which the cooling air of the engine flows outwardly. To substantially prevent a whirling of the forest ground and an annoying exhaust gas odor, a deflector wall 16 is provided at the outlet opening 13 which expands conically and can have a fan-like configuration so that the exiting gases are not directed in a narrow jet; instead, they exit in a fan-like flow.

The exhaust gases cleaned in the catalyzer 24 are intensely cooled by the cool-air flow of the engine 3. The guide pipe 10 is arranged in spaced relationship to the housing and can be cooled over its entire length by the cooling-air flow of the engine. The temperature of the cool-air flow coming from the cylinder is approximately 150° to 200° C. The hot exhaust gases which are at approximately 500° C. are mixed into this cool-air flow. Since the cooling-air quantity is approximately ten times greater than the exhaust gas quantity, a considerable reduction of the exhaust gas temperature is obtained.

The catalyzer 24 achieves a reduction of the exhaust emission. The catalyzer 24 is located in a partition wall 25 in the housing 17 of the muffler 8 and is welded gastight into the housing shell 19. The partition wall is disposed in a plane behind the interface 20 of the housing 17. The catalyzer 24 is located at a small spacing next to the cylinder 12 of the engine 3. A fast response of the catalyzer 24 is achieved by means of this arrangement close to the engine. The exhaust gas temperature is increased to approximately 1,000° C. because the conversion of hydrocarbon and carbon monoxide is an exothermal process. For this reason, the muffler housing shell 19 is configured as a double wall and provided with insulating material 32 in order to hold the surface temperatures as low as possible. In addition, a touch protective member 33 is provided to protect the operator as well as immediately surrounding components. The protective member 33 can be made as a perforated metal sheet of reduced weight.

Ignition and formation of flames by the exhaust gases exiting at the housing partition interface 20 are prevented by means of the special arrangement and positioning of the catalyzer 24 in the muffler 8. In addition, a flame-protecting sieve can be provided at the outlet from the housing shell 19 where the exhaust gases enter the guide pipe 10. To further reduce exhaust gas temperatures and to prevent the formation of flames at the muffler outlet, the exhaust gas is conducted through the guide pipe 10 to the engine-cooling air flow and is mixed with the latter. In this way, a total reduction of the exhaust gas emission as well as an elimination of the negative environmental effects and a reduction in noise is obtained. In addition, a fast response of the catalyzer is achieved.

In the embodiment of FIG. 3, it is noted that the touch protective member 33 has a heat protective plate 33' which is so extended that it overlaps the motor hood wall 34 of the chain saw 1 for an adequately long length. The overlapping of the heat protective plate 33' and the hood wall 34 is such that an adequate quantity of cooling air of the engine 3 flows into the clearance spacing 35 and into the outer clearance space 36. The clearance space 35 is between the inner side of the heat protective plate 33' and the muffler housing 17 while the space 36 is defined by the outer side of the heat protective plate 33' and the inner side of the hood wall 34. The heat protective plate 33' can be configured as one piece with the touch protective member 33. The touch protective member 33 is preferably so configured that it can be seated on the muffler housing 17 as a retrofit and mounted thereon so that even after the chain saw is manufactured, the heat protective plate or member can easily be equipped with the protective member 33.

Figure 6:
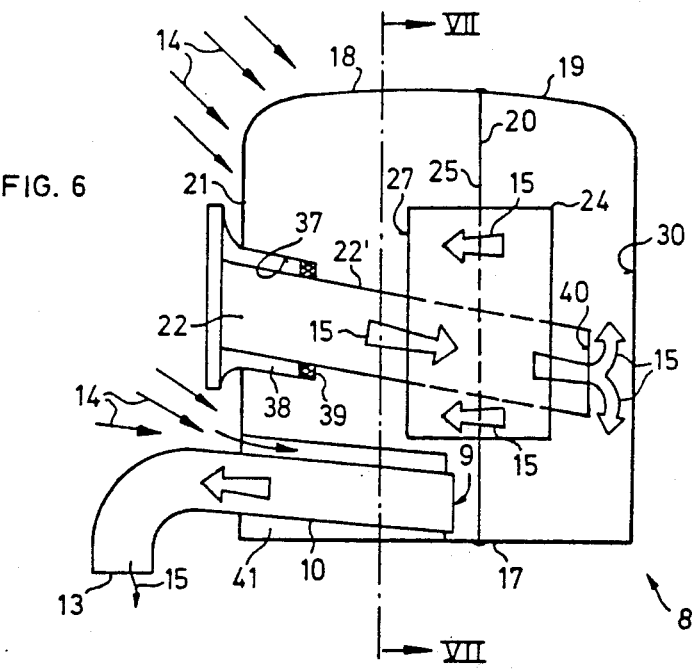
FIG. 6 is an alternate embodiment of the exhaust gas muffler according to the invention in a side elevation view similar to that of FIG. 3 and equipped, however, with an exhaust gas input pipe projecting far into the housing; and, FIG. 7 is another view of the exhaust gas muffler of FIG. 6 taken along section line VII—VII of FIG. 6.
Figure 7:
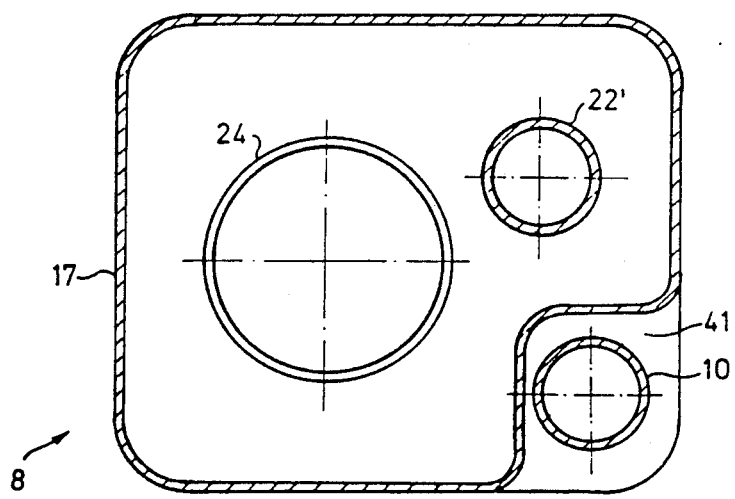

In a preferred embodiment according to FIGS. 6 and 7, it can be advantageous to provide an inlet pipe 22' in the muffler housing 17 which extends into the housing from the inlet side 22 across the partition interface 20 such that it terminates just ahead of housing wall 30 which lies opposite the rear wall 21 facing toward the engine. The housing 17 is preferably welded closed so as to be gastight. A widening 37 can be provided on the rear wall 21 which is so configured that the housing 17 with the rear wall 21 can be seated on a pipe stub 38 extending from cylinder 12. For achieving a gastight connection, a sealing ring 39 can be provided on the pipe stub 38 in the widening 37. The housing 17 is in this way hermetically sealed or closed so that the exhaust gas 15 exits exclusively through the guide pipe 10. The exhaust gas coming from the cylinder 12 is conducted through the inlet pipe 22' and exits at pipe end 40 ahead of the housing wall 30 and flows in an opposite direction through the catalyzer 24 as shown by the arrows 15 in FIG. 6. The exhaust gas coming from the engine is in this way first conducted into the housing shell 19 lying remote from the engine and only reaches the housing portion 18 lying next to the engine after passing through the catalyzer 24. In this embodiment, the flow of the exhaust gas within the housing 17 is in precisely the opposite direction so that the increased temperature exiting from the catalyzer 24 (approximately 1,000° C.) occurs in the housing part 18 disposed next to the cylinder 12 and the housing shell 19 lying remote from the cylinder 12 and its wall 30 remain cooler and do not become so hot that, with an advantageous configuration, an insulation and/or a double-walled configuration can be omitted. The shell-shaped housing part 18 of the housing 17 of the muffler 8 can likewise advantageously be charged with the cool-air flow 14 coming from the cylinder 12 so that the muffler 8 can here, too, be subjected to an intensive cooling. The housing 17 is welded gastight to the housing shell 19 and the muffler 8 is mounted closely next to the cylinder 12.

In addition, it can be advantageous to provide a recess 41 at one side of the muffler housing 17 in which the exhaust gas output 9 and the guide pipe 10 can be placed. The exhaust gas flows from the catalyzer 24 out of the housing part 18 through the exhaust gas outlet 9 into the exhaust gas guide pipe 10 to the ambient. Cooling air can likewise flow into the recess 41 in accordance with the flow arrows 41 shown in FIG. 6. In this way, the exhaust gas is intensively cooled on the entire path length of the guide pipe 10 so that a further reduction of the exhaust gas temperature is obtained.

The muffler 8 of the invention containing the catalyzer 24 can advantageously be so configured that existing chain saws can be retrofitted therewith. The muffler already present on the chain saw can be exchanged for the new muffler equipped with the catalyzer 24. For this purpose, it can be important that the one housing part 18 of the catalytic muffler 8 have the same configuration as the housing part of the old muffler to be exchanged.

It is understood that the foregoing description is that of the preferred embodiments of the invention and that various changes and modifications may be made thereto without departing from the spirit and scope of the invention as defined in the appended claims.

What is claimed is:

1. An exhaust gas muffler for a two-stroke engine, especially for a handheld portable tool such as a chain saw, the engine including a cylinder and a piston conjointly defining a combustion chamber wherein combustion gases are generated during operation of the engine, the exhaust gas muffler comprising:

a housing having an inner housing wall surface defining an interior space;

a catalyzer disposed in said interior space and including an enclosure wall having an outer enclosure wall surface;

mounting means for mounting said catalyzer in said interior spacer so as to cause said outer enclosure wall surface to be in spaced relationship to said inner housing wall surface on all sides of said catalyzer;

said mounting means and said catalyzer conjointly partitioning said interior spacer into first sand second chambers;

said housing having an inlet in said first chamber communicating with the combustion chamber of the engine so that the exhaust gases can pass into first chamber;

said catalyst defining a catalytic chamber for interconnecting said first and second chambers and for exothermally converting the exhaust gas and passing the converted exhaust gas to said second chamber;

said housing having an outlet in said second chamber for passing the exothermally converted exhaust gas out of said muffler;

said housing including a first housing part having said inlet formed therein and a second housing part having said outlet formed therein;

said housing parts being joined together at a common interface;

said mounting means being a partition wall supporting said catalyzer therein; and, said partition wall being welded gastight to said second housing part thereby placing said partition wall downstream of said common interface.

2. The exhaust gas muffler of claim 1, said housing comprising first and second pars welded together in a gastight manner.

3. The exhaust muffler of claim 1, said muffler being made of at least two parts so as to be capable of disassembly.

4. The exhaust gas muffler of claim 1, said second housing part having a shell-like shape; and, said outlet being the only exhaust gas outlet in said second housing part.

5. The exhaust gas muffler of claim 4, said catalytic chamber defining a flow-through path from said first chamber to said second chamber; and said partition wall having bypass means formed therein parallel to said flow-through path.

6. The exhaust gas muffler of claim 1, wherein said second housing part has an inner wall surface defining a portion of said second chamber for receiving the exothermally converted exhaust gas; said exothermally converted exhaust gas having heat which distributes on said inner wall surface and said second housing part having an outer wall surface to which said heat is transmitted; and, said muffler further comprising: a touch protective member for shielding an operator of the tool from the heat at the outer wall surface of said second housing part; and, said touch protective member being mounted on said housing.

7. The exhaust gas muffler of claim 6, said touch protective member being made of perforated sheet metal formed as a hood.

8. The exhaust gas muffler of claim 6, wherein the engine includes a fan for generating a cool air flow; said touch protective member including a heat protective plate disposed in said cool air flow so as to cause said cool air flow to skim over both sides of said plate.

9. The exhaust gas muffler of claim 8, said touch protective member and said heat protective plate being conjointly defined by an integral unitary piece.

10. The exhaust gas muffler of claim 8, wherein the tool includes an engine hood covering the engine and overlapping said housing of said muffler so as to define a clear space between said housing and said hood; and, said heat protective plate being extended into said clear gap in overlapping relationship to the engine hood so as to define a first gap between said hood and said protective plate and a second gap between said protective plate and said housing so as to cause the cool air flow to be received in both of said first and second gaps.

11. An exhaust gas muffler for a two-stroke engine, especially for a handheld portable tool such as a chain saw, the engine including a fan for generating a cool air flow and the engine further including a cylinder and a piston conjointly defining a combustion chamber wherein combustion gases are generated during operation of the engine, the exhaust gas muffler comprising:

a housing having an inner housing wall surface defining an interior space;

a catalyzer disposed in said interior space and including an enclosure wall having another enclosure wall surface;

mounting means for mounting said catalyzer in said interior space so as to cause said outer enclosure wall surface to be in spaced relationship to said inner housing wall surface on all sides of said catalyzer;

said mounting means and said catalyzer conjointly partitioning said interior space into first and second chambers;

said housing having an inlet in said first chamber communicating with the combustion chamber of the engine so that the exhaust gases can pass into said first chamber;

said catalyzer defining a catalytic chamber for interconnecting said first and second chambers and for exothermally converting the exhaust gas and passing the converted exhaust gas to said second chamber;

said housing having an outlet in said second chamber for passing the exothermally converted exhaust gas out of said muffler; and, pipe means extending from said outlet of said second chamber for conducting the exothermally converted exhaust gas into said cool air flow for mixing said exothermally converted exhaust gas with the latter.

12. An exhaust gas muffler for a two-stroke engine, especially for a handheld portable tool such as a chain saw, the tool having a rearward end and defining a longitudinal axis and a side wall extending in the direction of said axis, the engine including a fan for generating a cool air flow and the engine further including a cylinder and a piston conjointly defining a combustion chamber wherein combustion gases are generated during operation of the engine, the exhaust gas muffler comprising:

a housing having an inner housing wall surface defining an interior space;

a catalyzer disposed in said interior space and including an enclosure wall having an outer enclosure wall surface;

mounting means for mounting said catalyzer in said interior space so as to cause said outer enclosure wall surface to be in spaced relationship to said inner housing wall surface on all sides of said catalyzer;

said mounting means and said catalyzer conjointly partitioning said interior space into first and second chambers;

said housing having an inlet in said first chamber communicating with the combustion chamber of the engine so that the exhaust gases can pass into said first chamber;

said catalyzer defining a catalytic chamber for interconnecting said first and second chambers and for exothermally converting the exhaust gas and passing the converted exhaust gas to said second chamber;

said housing having an outlet in said second chamber for passing the exothermally converted exhaust gas out of said muffler;

a pipe extending outwardly from said outlet for conducting said exothermally converted exhaust gas away from said second chamber; and, said pipe being mounted so as to extend toward the rearward end of said tool and along said side wall and being disposed in said cool air flow so as to permit said cool air flow to skim over said pipe thereby cooling the exothermally converted exhaust gas passing therethrough.

13. The exhaust gas muffler of claim 12, wherein said tool is a chain saw having a forward tube-like handle extending across the tool in spaced relationship to said cylinder; said pipe having an end portion defining an outlet opening; said end portion being disposed beneath said tube-like handle and adjacent said cylinder so as to cause said outlet opening to be directed outwardly and transversely to said axis.

14. The exhaust gas muffler of claim 13, said pipe including a deflector wall mounted at said outlet opening for deflecting said exothermally converted exhaust gas flowing from said pipe.

15. The exhaust gas muffler of claim 14, said end portion being configured so as to widen in a fan-like manner toward said outlet opening.

16. An exhaust gas muffler for a two-stroke engine, especially for a handheld portable tool such as a chain saw, the engine including a cylinder and a piston conjointly defining a combustion chamber wherein combustion gases are generated during operation of the engine, the exhaust gas muffler being a replacement muffler for an existing muffler, the replacement muffler comprising:

a housing having an inner housing wall surface defining an interior space;

a catalyzer disposed in said interior space and including an enclosure wall having an outer enclosure wall surface;

mounting means for mounting said catalyzer in said interior space so as to cause said outer enclosure wall surface to be in spaced relationship to said inner housing wall surface on all sides of said catalyzer;

said mounting means and said catalyzer conjointly partitioning said interior space into first and second chambers;

said housing having an input pipe communicating with the combustion chamber of the engine and extending through said first chamber and past said catalyzer for conducting the exhaust gases into said second chamber;

said catalyzer defining a catalytic chamber for interconnecting said first and second chambers and for exothermally converting the exhaust gas and passing the converted exhaust gas from said second chamber to said first chamber; and, said housing having an outlet in said first chamber for passing the exothermally converted exhaust gas out of said muffler.

17. The replacement muffler of claim 16, wherein the engine includes a fan for generating a cool-air flow; said housing having a recess formed therein to receive said cool-air flow and said outlet being formed in said recess; and, said replacement muffler further comprising an exhaust gas pipe having a predetermined length and being disposed in said recess so as to be skimmed by said cool-air flow along said length.

* * * * *

UNITED STATES PATENT AND TRADEMARK OFFICE
CERTIFICATE OF CORRECTION

PATENT NO. : 4,890,690

DATED : January 2, 1990

INVENTOR(S) : Hartmut Fischer, Jürgen Grassmuck, Michael Wissmann and Albert Dreher It is certified that error appears in the above-identified patent and that said Letters Patent is hereby corrected as shown below:

In column 6, line 67: delete "spacer" and substitute -- space -- therefor.

In column 7, line 4: delete "spacer" and substitute -- space -- therefor.

In column 7, line 10: delete "catalyst" and substitute -- catalyzer -- therefor.

In column 7, line 29: delete "pars" and substitute -- parts -- therefor.

In column 7, line 40: insert a comma after "and".

In column 8, line 18: delete "another" and substitute -- an outer -- therefor.

Signed and Sealed this

First Day of January, 1991

Attest:

HARRY F. MANBECK, JR.

*Attesting Officer*     *Commissioner of Patents and Trademarks*